US009644041B2

(12) United States Patent
Groemping et al.

(10) Patent No.: US 9,644,041 B2
(45) Date of Patent: May 9, 2017

(54) PROCESS AND APPARATUS FOR PRODUCTION OF HALOGENATED BUTYL RUBBER WITH REDUCED EMISSIONS

(75) Inventors: Tobias Groemping, Cologne (DE); Sven Bach, Langenfeld (DE); Baecker Werner, Wipperfuerth (DE); Wei Chen, Singapore (SG); Paul Nguyen, London (CA); Kevin Alam, Sarnia (CA); Robert Michael Wise, Camlachie (CA); Thomas Mulder, Leverkusen (DE)

(73) Assignee: ARLANXEO Deutschland GmbH, Dormagen (DE)

( * ) Notice: Subject to any disclaimer, the term of this patent is extended or adjusted under 35 U.S.C. 154(b) by 449 days.

(21) Appl. No.: 14/115,477

(22) PCT Filed: May 18, 2012

(86) PCT No.: PCT/CA2012/000485
§ 371 (c)(1),
(2), (4) Date: Apr. 10, 2014

(87) PCT Pub. No.: WO2012/159198
PCT Pub. Date: Nov. 29, 2012

(65) Prior Publication Data
US 2014/0221576 A1    Aug. 7, 2014

(30) Foreign Application Priority Data
May 26, 2011  (EP) .................................. 11167595

(51) Int. Cl.
| | | |
|---|---|---|
| *C08C 19/14* | (2006.01) | |
| *B01J 19/00* | (2006.01) | |
| *B01J 19/18* | (2006.01) | |
| *C08F 8/20* | (2006.01) | |

(52) U.S. Cl.
CPC ............ *C08C 19/14* (2013.01); *B01J 19/006* (2013.01); *B01J 19/18* (2013.01); *B01J 19/1862* (2013.01); *C08F 8/20* (2013.01); *B01J 2219/00768* (2013.01); *B01J 2219/182* (2013.01)

(58) Field of Classification Search
CPC ...... B01J 19/006; B01J 19/18; B01J 19/1862; B01J 2219/00768; B01J 2219/182; C08C 19/14; C08F 8/20
USPC ....................................... 525/332.3; 422/131
See application file for complete search history.

(56) References Cited

U.S. PATENT DOCUMENTS

| | | | |
|---|---|---|---|
| 2,356,128 | A | 8/1944 | Thomas et al. |
| 5,407,974 | A | 4/1995 | Dallmeyer |
| 8,329,108 | B2 | 12/2012 | Lovegrove et al. |
| 2008/0262180 | A1 | 10/2008 | McDonald et al. |

FOREIGN PATENT DOCUMENTS

| | | | | |
|---|---|---|---|---|
| CN | 101942054 | | 1/2011 | |
| RU | 2320672 | * | 3/2008 | ............ C08C 19/12 |
| RU | 2320672 | | 1/2011 | |
| RU | 2415873 | | 1/2011 | |

OTHER PUBLICATIONS

European Search Report from co-pending European Application No. 12789112.5, Mar. 9, 2015, 3 pages.
Ullmann's Encyclopedia of Industrial Chemistry, vol. A23, 1993, VCH Verlag, Weinheim, Germany, pp. 288-295.
Morton, Rubber Technology, Third Edition, Chapter 10, 1987,Van Nostrand Reinhold Company, New York, New York, pp. 297-300.

* cited by examiner

*Primary Examiner* — Ling Choi
*Assistant Examiner* — Chun-Cheng Wang

(57) ABSTRACT

The present invention relates to a process for the production of halogenated butyl rubber and an apparatus for the production of rubber cement for use in the production of halogenated butyl rubber. The process and apparatus permit direct mixing of aqueous rubber slurry with a non-halogenated organic solvent to make a rubber cement solution. The water layer is then separated from the partially dissolved rubber cement and the cement phase is sent for halogenation. The apparatus is an enclosed vessel comprised of at least one dissolving zone and at least one separator zone. The process and apparatus advantageously employ recycle of rubber cement in order to disrupt an interface layer that forms between the water and rubber cement, to thereby improve continuously operation of the process.

6 Claims, 7 Drawing Sheets

PROCESS AND APPARATUS FOR PRODUCTION OF HALOGENATED BUTYL RUBBER WITH REDUCED EMISSIONS

FIELD OF THE INVENTION

The present invention relates to a process and apparatus for the production of halogenated butyl rubber. In particular, the invention relates to a process for the production of halogenated butyl rubber that utilizes a closed vessel for both the dissolution of the rubber in a non-halogenated solvent and the separation of water from the rubber. A closed loop system for recovering the solvent and maintaining a desired proportion of solvent to rubber is also provided.

BACKGROUND OF THE INVENTION

Poly(isobutylene-co-isoprene), or IIR, is a synthetic elastomer commonly known as butyl rubber which has been prepared since the 1940's through the random cationic copolymerization of isobutylene with small amounts of isoprene (1-2 mole %). As a result of its molecular structure, IIR possesses superior air impermeability, a high loss modulus, oxidative stability and extended fatigue resistance.

Butyl rubber is understood to be a copolymer of an isoolefin and one or more, preferably conjugated, multiolefins as comonomers. Commercial butyl comprises a major portion of isoolefin and a minor amount, usually not more than 2.5 mol %, of a conjugated multiolefin. Butyl rubber or butyl polymer is generally prepared in a slurry process using methyl chloride as a diluent and a Friedel-Crafts catalyst as part of the polymerization initiator. This process is further described in U.S. Pat. No. 2,356,128 and Ullmanns Encyclopedia of Industrial Chemistry, volume A 23, 1993, pages 288-295.

Halogenation of this butyl rubber produces reactive allylic halide functionality within the elastomer. Conventional butyl rubber halogenation processes are described in, for example, Ullmann's Encyclopedia of Industrial Chemistry (Fifth, Completely Revised Edition, Volume A231 Editors Elvers, et al.) and/or "Rubber Technology" (Third Edition) by Maurice Morton, Chapter 10 (Van Nostrand Reinhold Company © 1987), particularly pp. 297-300.

In the production of halogenated butyl rubber, one crucial step is the preparation of a rubber solution in a non-halogenated organic solvent, for example hexane, (called rubber cement), starting from rubber crumbs in water.

The current state of art for forming a rubber cement involves several stages where the rubber slurry which typically comprises 5-20 wt % rubber and 80-95 wt % water) is passed through a dewatering screen to remove the bulk water, then subsequently transferred to a pre-dissolving drum through a rotary valve where it is mixed with hexanes. The swelled rubber is then transferred to the dissolving drum and the surge drum prior to halogenation.

There are several disadvantages associated with such a cement forming process, for example, the commonly used surge drums are open to the atmosphere, the rotary valve on the pre-dissolving drum is a significant source of hexane emissions, the dewatering screens and rotary valve may have process and mechanical reliability issues, and more importantly, the existing system is not suitable for use with certain non-halogenated organic solvents having a lower boiling point than hexane, such as isopentane or n-pentane, due to excessive emissions.

Efforts to improve the current process and improve mechanical reliability have been made. For example, a process is known, according to Russian Patent 2320672 C1, wherein chlorinated butyl rubber is produced by mixing a 3-5%-aqueous dispersion of butyl rubber with a hydrocarbon solvent, dissolving butyl rubber at 20-60° C., separating the aqueous layer, and reacting a 10-15%-butyl rubber solution with tert-butylhypochlorite taken in an amount of 8% per rubber. The process is carried out in one or a series of reactors at 10-50° C., followed by neutralization of excess tert-butylhypochlorite with aqueous sodium sulfite and sodium hydroxide solutions until tert-butylhypochlorite is completely decomposed and the aqueous phase has a pH of 2-3. The method further involves separation of the phases, washing the rubber solution with water, additionally treating the chlorinated butyl rubber solution with an aqueous sodium hydroxide solution to a pH of 7-8, and isolating and drying the rubber. The method provides improved separation of the hydrocarbon and aqueous phases and decreased content of inorganic substances in the product. However, there are several limitations to the process disclosed. First, it specifically deals with chlorobutyl rubber. Secondly, it refers to a commercially impractical range of 3-5% aqueous dispersion of butyl rubber. Thirdly, it discloses a vertical mixing vessel and a vertical separator configuration, which may be detrimental to the phase separation by not providing adequate interface area and/or forming a difficult to separate emulsion. In addition, the rubber may mat at the interface between phases and thereby plug the separator.

As a result, there remains a need to develop alternative approaches to improve the process, including widening the applicability of the butyl and butyl-like rubbers to be processed and the organic solvents to be used, to improve the reliability and the efficiency of the process, and to reduce solvent emission.

SUMMARY OF THE INVENTION

The present invention is directed to a process and apparatus which allow direct contact of a rubber slurry having from greater than 5 wt % to 20 wt % rubber with a non-halogenated hydrocarbon solvent, without a need for all of the water removal steps, in an effort to mitigate the issues associated with the current cement forming process. The new process disclosed herein allows direct mixing of an aqueous rubber slurry with a non-halogenated organic solvent to make from 5 wt % to 30 wt % rubber cement solutions. The water layer is then separated from the partially dissolved rubber cement and the cement phase is sent for further processing. In a preferred embodiment, the apparatus used to carry out said process comprises an enclosed horizontal vessel comprised of at least one mixing chamber and at least one settling chamber. The two mixing chambers in a series configuration allow more homogeneous mixing to take place, with reduced propensity for emulsion formation, which facilitates better phase separation.

According to one aspect of the present invention, there is provided a process for the continuous production of halogenated butyl rubber, the process comprising: continuously providing a butyl rubber slurry comprising butyl rubber in water; dissolving the butyl rubber slurry in a non-halogenated hydrocarbon solvent to form a butyl rubber cement in water; phase separating the water from the rubber cement in a closed separator, thereby forming an interface layer in the separator; and, halogenating the rubber cement to thereby produce the halogenated butyl rubber.

According to another aspect of the present invention, there is provided an apparatus for the production of a butyl rubber cement from a butyl rubber slurry, the cement comprising butyl rubber in a non-halogenated organic solvent and slurry comprising butyl rubber in water, the apparatus comprising: a closed dissolving zone configured for receiving the butyl rubber slurry and the non-halogenated organic solvent, the dissolving zone comprising mixing means for agitating the slurry and the solvent, the butyl rubber dissolving in the solvent to form the butyl rubber cement in water; and, a closed separator zone horizontally adjacent to the dissolving zone, the separator zone facilitating phase separation of the butyl rubber cement from the water by formation of a water layer vertically spaced apart from a cement layer across an interface layer, the separator zone comprising a substantially horizontal flow path and having at least two outlets vertically spaced apart by a distance sufficient to separately collect the water layer and the cement layer.

BRIEF DESCRIPTION OF THE DRAWINGS

The invention will now be described by way of reference to the drawings, in which.

DETAILED DESCRIPTION OF THE INVENTION

Figure 1:
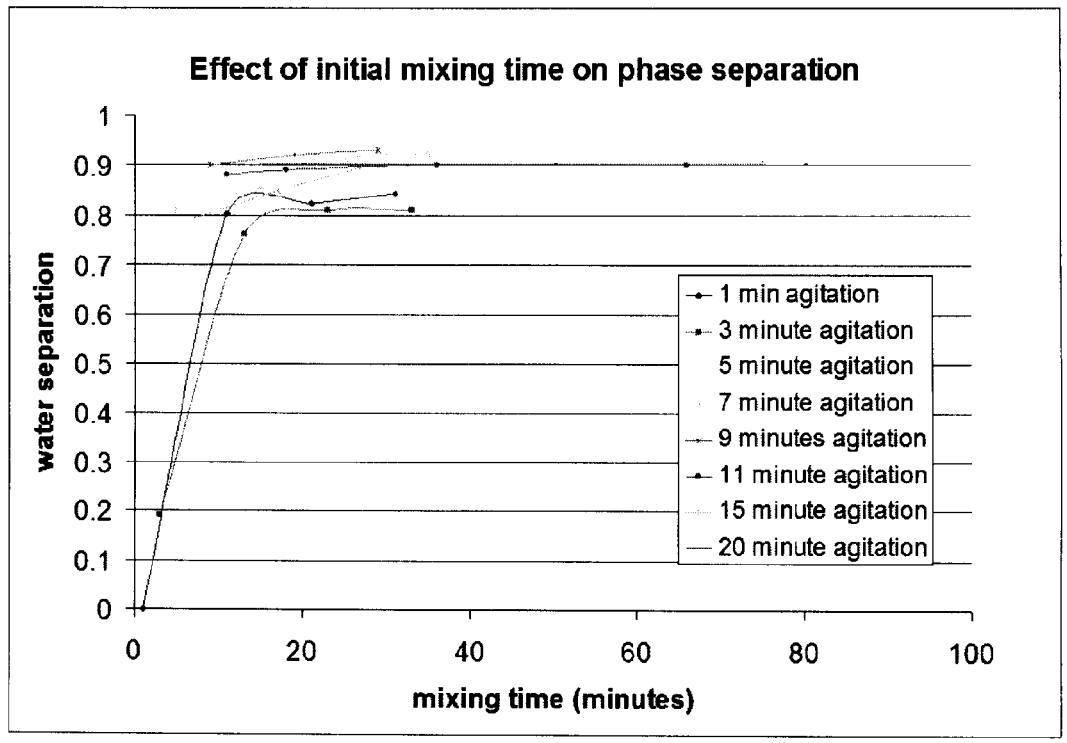
FIG. 1 illustrates the effect of initial agitation time on cement/water phase separation in lab batch experiments.
Figure 2:
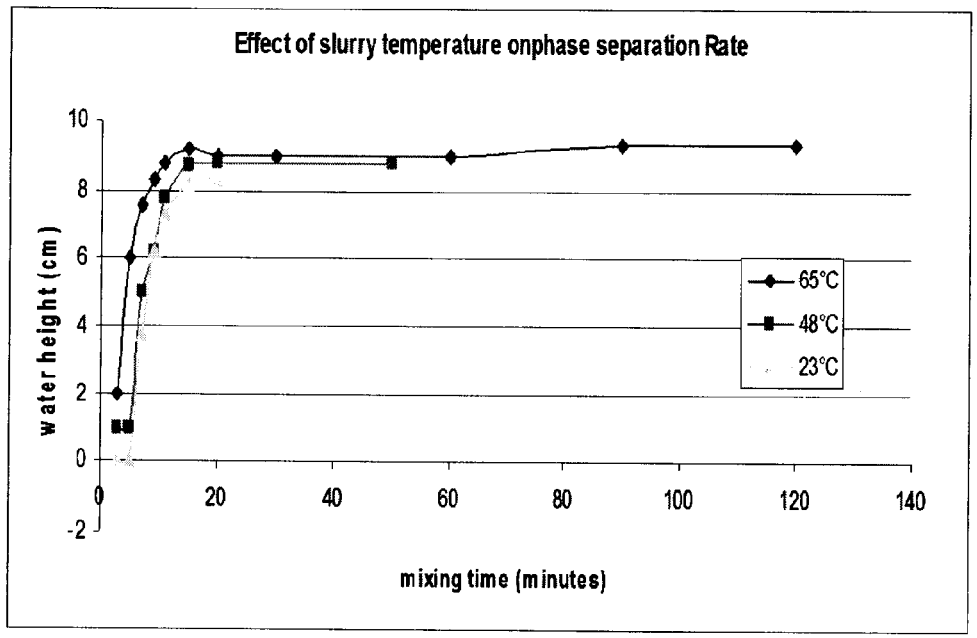
FIG. 2 illustrates the effect of slurry temperature on settling rate in lab batch experiments.
Figure 3:
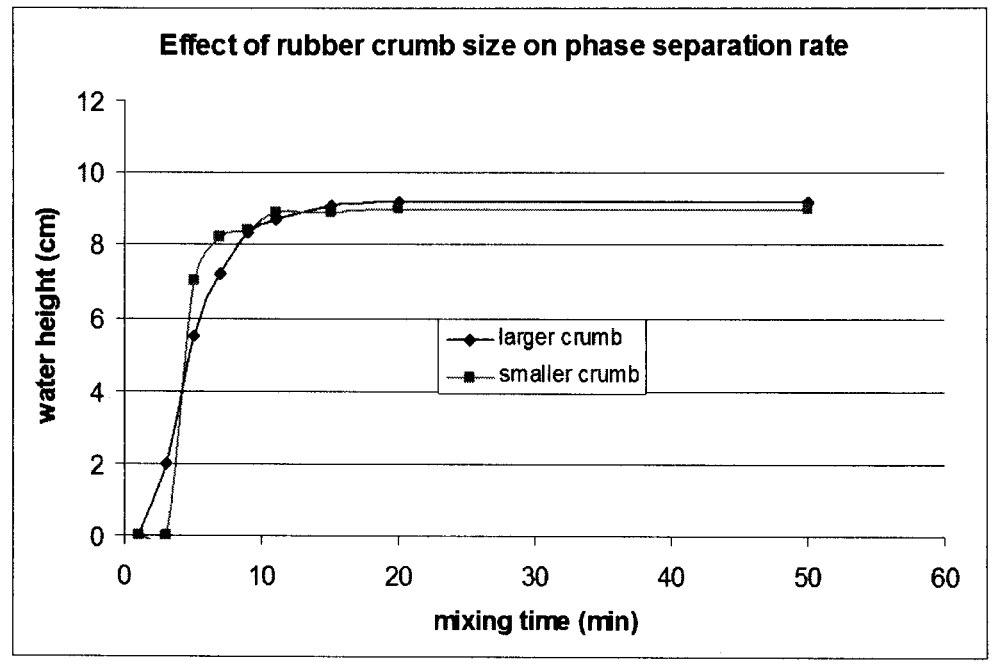
FIG. 3 illustrates the effect of rubber crumb size on settling rate in lab batch experiments.
Figure 4:
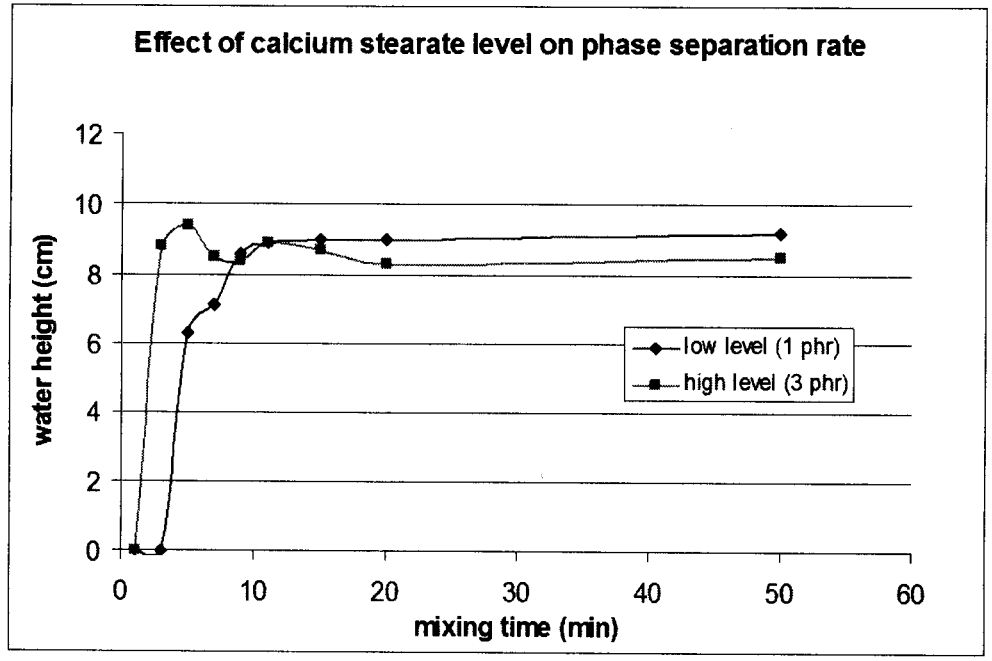
FIG. 4 illustrates the effect of calcium stearate level on settling rate in lab batch experiments.
Figure 5:
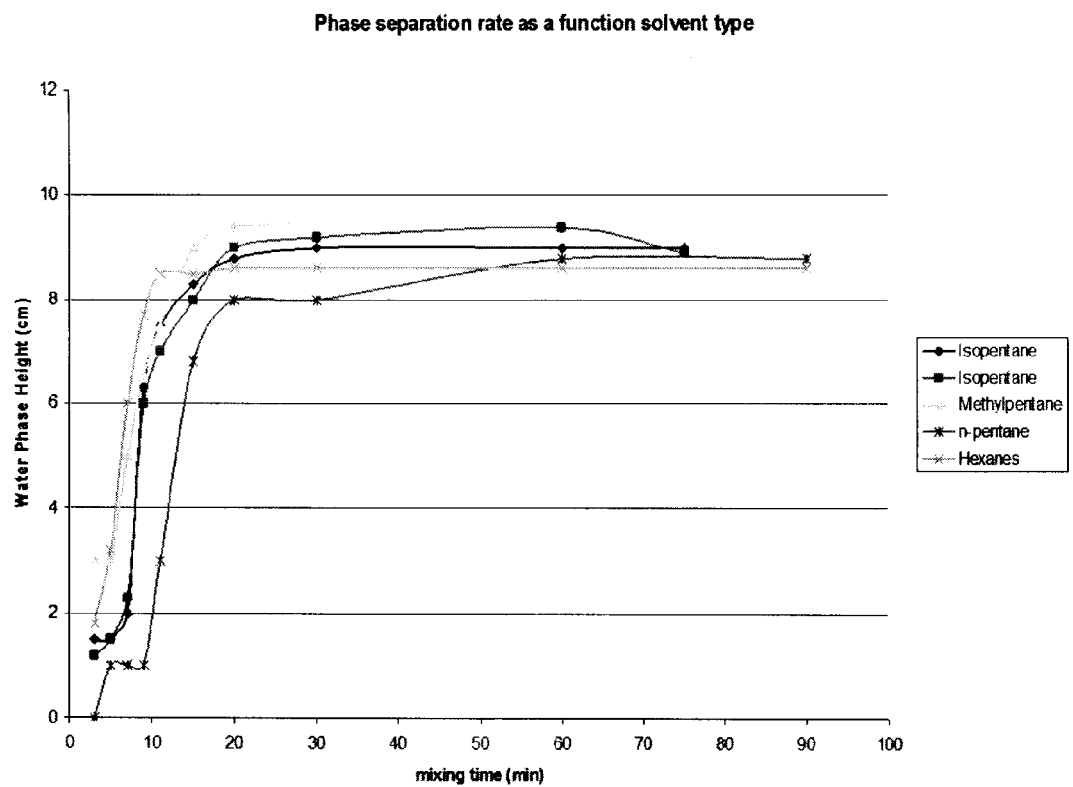
FIG. 5 illustrates the effect of solvent type on settling profile in lab batch experiments.

Butyl rubber polymers are generally derived from at least one isoolefin monomer, at least one multiolefin monomer and optionally further copolymerizable monomers. In one embodiment, the butyl rubber may comprise repeating units derived from an isomonoolefin monomer and a conjugated diene monomer. In another embodiment, the butyl rubber may comprise repeating units derived from an isomonoolefin monomer and a styrenic monomer. In yet another embodiment, the butyl rubber may comprise repeating units derived from an isomonoolefin monomer, a conjugated diene monomer and a styrenic monomer.

The butyl rubber is not limited to a specific isoolefin. Any isoolefin, as known to those of skill in the art, are contemplated by the present invention including isoolefins having, for examples, within the range of from 4 to 16 carbon atoms. In one embodiment of the present invention, isomonoolefins having from 4 to 7 carbon atoms are contemplated. Examples of isomonoolefins for use in the present invention include isobutene, 2-methyl-1-butene, 3-methyl-1-butene, 2-methyl-2-butene, 4-methyl-1-pentene and mixtures. A preferred isomonoolefin is isobutene (isobutylene).

Similarly, the butyl rubber is not limited to a specific multiolefin. Multiolefins copolymerizable with the isoolefins, as known to one skilled in the art, can be used in the practice of the present invention. Multiolefin monomers comprising conjugated aliphatic dienes are preferred. Examples of such multiolefins include, for example, those having in the range of from 4-14 carbon atoms, preferably from 5 to 11 carbon atoms. Examples of suitable multiolefins include isoprene, butadiene, 2-methylbutadiene, 2,4-dimethylbutadiene, piperyline, 3-methyl-1,3-pentadiene, 2,4-hexadiene, 2-neopentylbutadiene, 2-methly-1,5-hexadiene, 2,5-dimethly-2,4-hexadiene, 2-methyl-1,4-pentadiene, 2-methyl-1,6-heptadiene, cyclopentadiene, methylcyclopentadiene, cyclohexadiene, 1-vinyl-cyclohexadiene and mixtures thereof. A preferred multiolefin comprises isoprene.

The butyl rubber useful in the present invention may include a co-monomer other than the above referenced multiolefins, such as an alkyl-substituted vinyl aromatic co-monomer, including but not limited to a $C_1$-$C_4$ alkyl substituted styrene. Specific examples of such co-monomers include, for example, α-methyl styrene, p-methyl styrene, chlorostyrene, cyclopentadiene and methylcyclopentadiene. In this embodiment of the present invention, the butyl rubber polymer may include, for example, random copolymers of isobutylene, isoprene and para-methylstryene.

A preferred butyl rubber contains at least 0.5 mol %, preferably at least 0.75 mol %, more preferably at least 1.0 mol %, yet more preferably at least 1.5 mol %, still more preferably at least 2.0 mol % of repeating units derived from at least one multiolefin monomer.

Once the butyl rubber is formed from the monomer mixture, it is provided to a finishing process as rubber crumb in an aqueous slurry. In order to prevent excessive emissions of solvent, rather than separating the rubber crumb from the water, the slurry is instead vigorously mixed with a non-halogenated organic solvent, in order to dissolve the rubber crumb in the solvent. A gravity separation process then takes place where the aqueous and organic phases are allowed to separate from one another. In this gravity separation process, an intermediate layer, sometimes known as the "rag layer", can form between the phases. It is important to disrupt this layer in order to prevent plugging and contamination of downstream equipment. The disruption of the layer is desirably done in a gentle manner in order to prevent emulsification of the phases at the interface, which prolongs the time period required for adequate separation to take place.

In one embodiment, disruption of the intermediate layer is effected through recycling a portion of the organic phase into the separator. The amount of recycle is desirably kept small, as recycle decreases the overall residence time through the separator and thereby negatively impacts the separation process. In order to minimize the amount of solvent required to be recycled it is desirable that the recycled solvent be introduced directly into the intermediate layer to gently disrupt it and thereby prevent plugging of downstream equipment.

In one embodiment, the ratio of recycled organic solvent to total rubber cement exiting the separator is less than 20%, preferably less than 15%, more preferably less than 10% by volume. In another embodiment, the intermediate layer is mixed with a power input of from 0.001 to 0.05 W/l, preferably from 0.01 to 0.04 W/l, more preferably from 0.015 to 0.03 W/l.

The residence time in the mixing zone is from 3 to 120 minutes, preferably from 4 to 60 minutes, more preferably from 5 to 30 minutes. The mixing time may be influenced by at least the mixing temperature and choice of solvent.

The process may be conducted at room temperature or greater than room temperature. The mixing and separation steps may be conducted at different temperatures. The process is preferably conducted at a temperature of from 20 to 85° C., preferably from 25 to 75° C., more preferably from 30 to 70° C., still more preferably from 50 to 70° C.

The process may be conducted at ambient pressure, below or above ambient pressure. At the temperatures mentioned above the pressure may rise to values well above ambient pressure but is then typically below 2 MPa.

In order to provide an economic throughput while still achieving efficient separation, it is desirable that the incoming aqueous rubber slurry comprises from greater than 5% up to 20% by weight of butyl rubber in water. Preferably, the rubber slurry concentration comprises from 6% to 12% by weight of butyl rubber in water. The rubber cement exiting the separator preferably comprises from greater than 5% up to 30% by weight of butyl rubber. Preferably, the rubber cement comprises from 18% to 22% by weight of butyl rubber.

In one embodiment, the non-halogenated organic solvent is preferably selected from the group consisting of non-halogenated aliphatic hydrocarbons. In a preferred embodiment of the invention the non-halogenated organic solvent comprises at least 80 wt.-% of one or more non-halogenated aliphatic hydrocarbons having a boiling point in the range of 25° C. to 100° C. at a pressure of 1013 hPa, preferably at least 90 wt.-%, even more preferably at least 95 wt.-% and yet even more preferably at least 99 wt.-% the remainder being other non-halogenated hydrocarbons. Non-halogenated aliphatic hydrocarbons having a boiling point in the range of 25° C. to 100° C. at a pressure of 1013 hPa include n-pentane, isopentane, cyclopentane, 2,2-dimethylbutane, 2,3-dimethylbutane, 2-methylpentane, 3-methylpentane, n-hexane, methylcyclopentane, 2,2,3-trimethylbutane, n-heptane, 2-methylhexane, 3-methylhexane, 2,2-dimethylpentane, 2,3-dimethylpentane, 2,4-dimethylpentane, 3,3-dimethylpentane, 3-ethylpentane and 2,2-dimethylpentane.

In another embodiment, the non-halogenated organic solvent is selected from the group consisting of n-pentane, isopentane, cyclopentane, 2,2-dimethylbutane, 2,3-dimethylbutane, 2-methylpentane, 3-methylpentane, n-hexane, methylcyclopentane, 2,2,3-trimethylbutane, n-heptane, 2-methylhexane, 3-methylhexane, 2,2-dimethylpentane, 2,3-dimethylpentane, 2,4-dimethylpentane, 3,3-dimethylpentane, 3-ethylpentane and 2,2-dimethylpentane or mixtures thereof.

Once the butyl rubber cement is formed, the butyl rubber may be subjected to a halogenation process in order to form a halogenated butyl rubber which is herein also referred to as halobutyl rubber. Bromination or chlorination can be performed according to the process known by those skilled in the art, for example, the procedures described in Rubber Technology, 3rd Ed., Edited by Maurice Morton, Kluwer Academic Publishers, pp. 297-300 and further documents cited therein, which are all incorporated herein by reference.

In one embodiment, a halogenated butyl rubber includes a halogenated butyl rubber having isobutylene and less than 2.2 mol % isoprene. Such halogenated butyl rubber is commercially available for example from LANXESS Deutschland GmbH and sold under the name BB2030™.

The apparatus used in carrying out the rubber cement make up process is an enclosed horizontal vessel comprised of at least one mixing zone (or dissolving zone) and at least one separator zone (or settling zone) designed to carry out the cement make up process.

In an embodiment there is provided an apparatus for the production of a butyl rubber cement from a butyl rubber slurry, the cement comprising butyl rubber in a non-halogenated organic solvent and slurry comprising butyl rubber in water, the apparatus comprising a closed dissolving zone configured for receiving the butyl rubber slurry and the non-halogenated organic solvent, the dissolving zone comprising mixing means for agitating the slurry and the solvent, the butyl rubber dissolving in the solvent to form the butyl rubber cement in water; and, a closed separator zone horizontally adjacent to the dissolving zone, the separator zone facilitating phase separation of the butyl rubber cement from the water by formation of a water layer vertically spaced apart from a cement layer across an interface layer, the separator zone comprising a substantially horizontal flow path and having at least two outlets vertically spaced apart by a distance sufficient to separately collect the water layer and the cement layer. In another embodiment, the apparatus further comprises mixing means extending into the interface layer to agitate and disrupt the interface layer. In another embodiment, the mixing means comprises a fluid conduit for introducing rubber cement into the interface layer.

It is desirable that the dissolving and separating steps take place in a closed vessel in order to reduce the total amount of solvent emissions from the process. It is further desirable that both steps take place in a common vessel to reduce piping in between vessels, which can lead to the formation of stable emulsions that negatively impact settling efficiency. The vessel may be divided into a mixing zone and separator zone. The zones are preferably separated from one another by internal vessel structure that restricts or prevents uncontrolled movement of fluid between zones.

The dimensions of the mixing zone may be different from those of the separator zone. The mixing zone may have a larger width and shorter length than the separator zone. The mixing zone is preferably laterally adjacent to the separator zone. The fluid outlets of the separator are desirably vertically spaced apart from one another by a distance sufficient to permit the upper and lower fractions within the separator to be withdrawn separately from one another. The fluid outlets are preferably located at an opposite end of the separator from the mixing zone. This promotes a more even residence time distribution and reduces the propensity for fluid short circuiting within the reactor.

Flow through the mixing and separator zones is preferably horizontal. This is provided in order to improve the degree of separation that takes place and to better control residence time of the aqueous and organic phases. By flowing horizontally, a desired flow rate can be extracted from each of the upper and lower fractions of the separator to control the residence time of each fraction, preferably in order to maintain a constant residence time from each fraction. Vertical flow patterns promote mixing between the upper and lower fractions and make it difficult to match the residence times of the fractions in order to maintain a homogeneous residence time distribution within the separator. Horizontal flow patterns therefore generally promote better overall separation between the upper and lower fractions. In addition, a vertical separator generally has a smaller interface area for phase separation compared to a horizontal vessel and a vertical separator is prone to matting and plugging due to rubber accumulation at the interface, especially without agitation of the interface layer.

Figure 6:
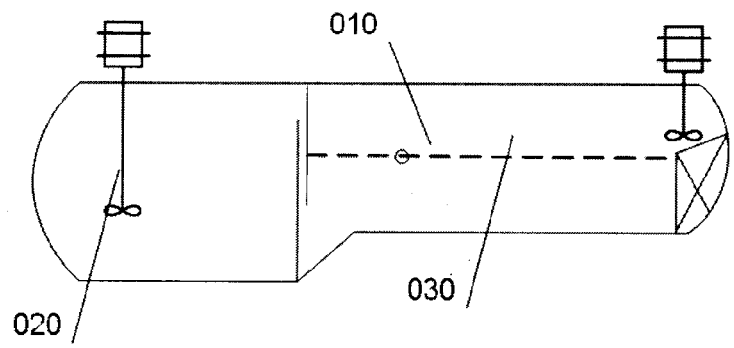
FIG. 6 illustrates a front view of a closed horizontal apparatus for rubber cement formation.

FIG. 6 illustrates the schematic drawing of an enclosed horizontal vessel 010 comprised of a mixing chamber or mixing zone 020, which is a continuous stirred tank reactor, and a settling chamber or separator zone 030.

Figure 7:
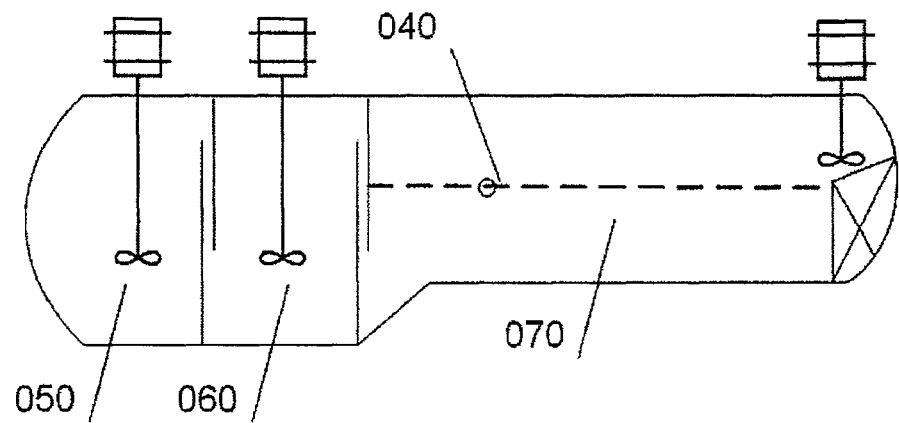
FIG. 7 illustrates a front view of another closed horizontal apparatus for rubber cement formation.

FIG. 7 illustrates the schematic drawing of another enclosed horizontal vessel 040 comprised of two mixing chambers 050 and 060 respectively, and a settling chamber 070.

As shown in the below experiments, the phase separation rate is dependent on mixing time and amount of dissolved rubbers in the mixture. Therefore, it is concluded that two or more continuous stirred tank reactors (CSTR) in series provide more homogenous mixing, which enables better separation.

Figure 8:
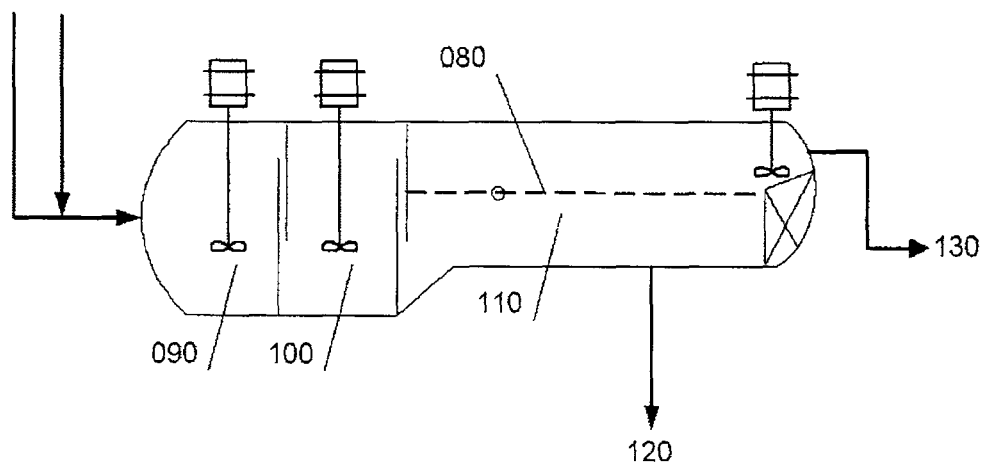
FIG. 8 illustrates a flowchart illustrating the design features of a closed horizontal apparatus for rubber cement formation.

FIG. 8 is a flowchart of an enclosed horizontal vessel 080 in the rubber cement makeup process. Rubbery slurry and solvent were introduced in the vessel and pass through the two mixing chambers 090 and 100 respectively, before entering the settling chamber 110 of the vessel. The water phase is treated to remove entrained solvents and recycled as process water through outlet 120. The rubber layer is passed through outlet 130 for downstream processing. The vessel is operated in a flooded condition. The connection to the downstream process is as short and direct as possible (horizontal or slight downhill slope). The inlet into the mixing zone is from the side near to the top.

The size of the mixing or dissolving zone is determined according to the necessary residence time. In one embodiment, the specific power input is from 1.0 to 2.0 kW/m$^3$, preferably from 1.2 to 1.5 kW/m$^3$. The dissolving zone may comprise two or more mixing chambers that are equipped with a multi-stage mixer, for example a two stage Viscoprop™ with a diameter of 2500 mm and a blade angle of 53°, and two or more flat baffles. The position of the stages is selected such that, in the event of mixer failure, the stages stay in the water phase. This reduces the likelihood for formation of a stable emulsion (locally incorrect phase ratio), when the agitators restart. The inlet position is chosen to reduce fluid short -circuiting to a minimum. Premixing of the slurry and the solvent is recommended, for example by combining the two in a T-shaped section of piping, optionally including static mixing elements. For the lift-up agitator at the end of the separator, a cross-bar agitator with a blade angle of for example 45 degree may be used to produce an upward direction of flow. The specific power input is for example about 0.1 kW/m$^3$.

In one embodiment, the separator zone comprises a series of overflow and underflow weirs in order to create a serpentine flow path and a homogenous residence time distribution. The flow path through the separator is substantially horizontal overall. The weirs are for example designed to form a rectangular channel, in which the mean down flow velocity is between 0.1 and 0.5 m/s, preferably 0.4 m/s at maximum flow rate. This ensures that the dispersed organic phase moves down with reference to the settler wall, even though the dispersed organic phase will move upwards relatively to the continuous water phase due to buoyant force. In one embodiment, the settler is calculated to have a diameter of from 1.5 to 5 m, preferably of from 2.5 to 4.0 m and an active settling length of from 3 to 20 m, preferably of from 8 to 15 m.

In one embodiment, the mixing chambers are designed to provide a mean residence time of 14 minutes in each chamber. This mixing time is selected in order to dissolve the minimum portion of rubber prior to separation in order to ensure a sufficient phase separation performance. There may be two or more mixing chambers in series. In one embodiment, the closed top of the mixing chambers and the separator have the same elevation in order to be able to operate the apparatus in the abnormal case that the mixer of the second chamber breaks down. In this case, the second mixing chamber can be used as an extension of the separator. This is difficult to do if the top of the chambers are not at the same elevation.

EXAMPLES

The present invention may be demonstrated with reference to the following non-limiting examples.

First, laboratory batch experiment studies were carried out using a closed glass reactor apparatus to simulate plant conditions. Several pertinent data of the cement properties were obtained from the experiments and are reported herein.

Subsequent batch trials were conducted at the LANXESS Rubber plant using a 50 L agitated vessel. These trials provided the basis for the design of the production scale mixer-settler apparatus. The design of the mixer-settler is given in the report for a maximum total inlet volume flow of 300 m$^3$/h, which corresponds to 16 t/h of rubber crumbs.

A 2920 L pilot plant scale vessel with two agitated mixing chambers and one settling chamber was constructed to verify the design under continuous flow conditions.

Example 1

Laboratory Batch Experiments

Batch experiments were carried out using a closed glass reactor apparatus to simulate plant conditions. The main variables that were investigated for their influences on the cement make up process are: agitation time; temperature (23° C., 40° C. and 65° C.); butyl rubber grades (LANXESS chlorobutyl CB1240 and bromobutyl BB2030, BB2040 and BBX2 base rubbers) rubber particle size (large crumb size: 6.3-19.9 mm, small crumb size: 0.5-3.5 mm); calcium stearate level (1% and 3%); and solvent type (hexanes, isohexane, isopentane, n-hexane).

Materials Used in this Study

Butyl rubber crumb (chlorobutyl CB1240 and bromobutyl BB2030, BB2040 & BBX2 base rubber) was used as supplied by LANXESS Inc.

LANXESS bromobutyl BB2030 is a brominated isobutylene-isoprene copolymer with a bromine content of 1.8±0.2 wt-% and a Mooney viscosity (ML 1+8 @ 125° C.) of 32±4.

LANXESS chlorobutyl CB1240 is chlorinated isobutylene-isoprene copolymer with a chlorine content of 1.25±0.1 wt-% and a Mooney viscosity (ML 1+8 @ 125° C.) of 38±4.

LANXESS BB2040 is a brominated isobutylene-isoprene copolymer with a bromine content of 1.8±0.2 wt-% and a Mooney viscosity (ML 1+8 @ 125° C.) of 39±4.

LANXESS BBX2 is a brominated isobutylene-isoprene copolymer with a bromine content of 1.8±0.2 wt-% and a Mooney viscosity (ML 1+8 @ 125° C.) of 46±4.

The following solvents were used: hexane (distillation range 65 to 69° C.) and isohexane (distillation range 57 to 61° C.) (from Imperial Oil); isopentane and n-pentane (from Sigma-Aldrich). Distilled/deionized water was used for all experiments.

General Procedure for Dissolving and Phase Separation Experiments

The following steps were followed in dissolving and phase separation experiments:
1. set up a closed glass apparatus equipped with a 4 L cylindrical reactor flask, a three-necked reactor head, a water-cooled condenser, an overhead agitator;
2. heat up the water with steam to 75-80° C. and transfer the required amount to the reactor flask (this step is not required if the experiment is to be carried out at room temperature);
3. measure the height of the water from bottom to the water meniscus level and record temperature;
4. weigh out the required wet rubber crumb and transfer it into the flask;
5. measure the height of the water from bottom to the water meniscus level and record temperature;
6. assemble the top and ensure the whole apparatus is well enclosed with no leaks with cold water running through the condenser;
7. turn on the agitator and set to 600 rpm;
8. ensure that the temperature of the rubber water slurry in the flask reaches the desired temperature (this step is not required if the experiment is to be carried out at room temperature);
9. measure and transfer the hydrocarbon solvent into the flask using an additional funnel;
10. start timer and allow the rubber slurry content to agitate for a desired time period;
11. stop agitation and measure the height of the water and the rubber cement phases;
12. restart agitation and stop after one hour to ensure complete dissolution of the rubber in hydrocarbon;
13. a rubber cement sample is then taken using a syringe for viscosity, rubber solid and water content.

Solution Viscosity Measurement

Viscosity measurements were performed on the Brookfield™ LV-DV III Ultra Viscometer in a fume hood. The instrument was calibrated using Brookfield standard silicone oils of 1000 cP, 5000 cP, and 12,500 cP and at 25° C. The Small Sample Adapter and spindle SC4-18 were used for all viscosity measurements.

Rubber Concentration and Water Content Measurements

The cement properties such as rubber concentration and water content were measured using the laboratory procedures as follows.

Place an empty centrifuge tube in the clamp provided in the fume hood. Fill the centrifuge tube 90 to 100 mL of the rubber solution. Centrifuge the cement for 10 minutes at approximately 1000 rpm. Remove the sample from the centrifuge and record the volume of water (bottom layer) and the total volume (hexane and water). Fill a clean/dry syringe with about 3 mL of the upper hexane layer. Weigh the syringe and the cement to three decimal places. Record the weight. Weigh a dry aluminum tare to three decimal places. Record the weight. Put 2-3 mL of the rubber solution from the syringe into the tare. Weigh the empty syringe to three decimal places. Record the weight. Put the tare with cement in it on the hotplate in the fumehood and leave until dry. Once dry, place the tare in the desiccator until cooled. Weigh the tare plus the rubber to three decimal places. Record the weight.

Calculations

Density of water at room temperature is taken to be 1 g/mL

Density of hexane+rubber solution is calculated from:

$d$, Density of hexane phase $= (0.002071 * S * 100) + 0.660$

A=Total volume of sample (hexane+water) in mL

B=Volume of water in mL

C=Volume of hexane+rubber in mL (equals [A−B])

D=weight of syringe plus cement.

E=weight of empty aluminum tare.

F=weight of syringe after transferring the cement to the tare.

G=weight of aluminum tare plus dried rubber.

S=solids result.

$$\text{Solids}(w/w) = \frac{G-E}{D-F}$$

$$\% \text{ water}(w/w) = \frac{B}{B+C*d} * 100$$

$$\% \text{ TotalSolids} = (100 - \% \text{ Water}) * S$$

Results

The lab batch experiments were designed to investigate key parameters effecting the dissolving and phase separation processes during cement make up. The following tables list the controlled experiments performed to investigate the key parameters for dissolving and phase separation processes.

TABLE 1

Controlled experiments to investigate initial agitation time on phase separation

| Expt # | Solvent | Base Rubber | Cement Solid (wt %) | Initial Slurry Temp (° C.) | Initial Agitation Time |
|---|---|---|---|---|---|
| 1 | Hexane | LANXESS CB1240 | 22 | 70 | 30 Seconds |
| 2 | Hexane | LANXESS CB1240 | 22 | 70 | 1 Minutes |
| 3 | Hexane | LANXESS CB1240 | 22 | 70 | 3 Minutes |
| 4 | Hexane | LANXESS CB1240 | 22 | 70 | 5 Minutes |
| 5 | Hexane | LANXESS CB1240 | 22 | 70 | 7 Minutes |
| 6 | Hexane | LANXESS CB1240 | 22 | 70 | 9 Minutes |
| 7 | Hexane | LANXESS CB1240 | 22 | 70 | 11 Minutes |
| 8 | Hexane | LANXESS CB1240 | 22 | 70 | 15 Minutes |
| 9 | Hexane | LANXESS CB1240 | 22 | 70 | 20 Minutes |

TABLE 2

Controlled experiments to investigate initial slurry temperature on phase separation

| Expt # | Solvent | Base Rubber | Cement Solid (wt %) | Initial Slurry Temp (° C.) |
|---|---|---|---|---|
| 10 | Hexane | LANXESS CB1240 | 22 | 70 |
| 11 | Hexane | LANXESS CB1240 | 22 | 65 |
| 12 | Hexane | LANXESS CB1240 | 22 | 40 |
| 13 | Hexane | LANXESS CB1240 | 22 | 23 |

TABLE 3

Controlled experiments to investigate rubber crumb particle size on phase separation

| Expt # | Solvent | Base Rubber | Cement Solid (wt %) | Initial Slurry Temp (° C.) | Rubber Crumb Particle Size |
|---|---|---|---|---|---|
| 14 | Hexane | LANXESS CB1240 | 22 | 65 | 6-19.9 mm |
| 15 | Hexane | LANXESS CB1240 | 22 | 65 | 0.5-3.5 mm |

TABLE 4

Controlled experiments to investigate calcium stearate content on phase separation

| Expt # | Solvent | Base Rubber | Cement Solid (wt %) | Initial Slurry Temp (° C.) | Calcium Stearate Level |
|---|---|---|---|---|---|
| 16 | Hexane | LANXESS CB1240 | 22 | 65 | 1 wt % |
| 17 | Hexane | LANXESS CB1240 | 22 | 65 | 3 wt % |

TABLE 5

Controlled experiments to investigate cement solid on phase separation

| Expt # | Solvent | Base Rubber | Cement Solid (wt %) | Initial Slurry Temp (° C.) |
|---|---|---|---|---|
| 18 | Hexane | LANXESS BBX2 | 22 | 65 |
| 19 | Hexane | LANXESS BBX2 | 22 | 65 |
| 20 | Hexane | LANXESS BBX2 | 24 | 65 |
| 21 | Hexane | LANXESS BBX2 | 24 | 65 |
| 22 | Isohexane | LANXESS BBX2 | 24 | 65 |
| 23 | Isopentane | LANXESS BBX2 | 24 | 23 |

TABLE 6

Controlled experiments to investigate solvent type on phase separation

| Expt # | Solvent | Base Rubber | Cement Solid (wt %) | Initial Slurry Temp (° C.) |
|---|---|---|---|---|
| 24 | Isopentane | LANXESS BB2040 | 24 | 23 |
| 25 | Hexane | LANXESS BB2040 | 24 | 65 |
| 26 | Isopentane | LANXESS BB2030 | 24 | 23 |
| 27 | Hexane | LANXESS BB2030 | 24 | 23 |
| 28 | Isohexane | LANXESS BB2030 | 24 | 65 |
| 29 | n-Pentane | LANXESS BB2030 | 24 | 23 |
| 30 | Hexane | LANXESS BB2030 | 24 | 65 |
| 31 | Hexane | LANXESS BB2030 | 24 | 23 |

Rubber Solution Properties

For experiments 1-18, the water content in the cement was determined based on the initial height of the water phase and the final height of the water phase at the end of the experiments (Table 7).

TABLE 7

Calculated water content in rubber cement phase after dissolving/separation experiments

| # | wt of water added (g) | wt of water in the wet rubber crumb (g) | Total water content (g) | Height water expected (cm) | water level at the end of exp. (cm) | Est. water in cement (g) | Calc. water in cement (wt %) | Rubber in cement (wt %) |
|---|---|---|---|---|---|---|---|---|
| 1 | 1740 | 59.81 | 1799.81 | 10.55 | 9.50 | 178.39 | 16.54 | 18.6 |
| 2 | 1740 | 59.81 | 1799.81 | 10.55 | 9.50 | 178.39 | 16.54 | 18.6 |
| 3 | 1724 | 75.51 | 1799.51 | 10.95 | 9.20 | 295.72 | 24.73 | 16.7 |
| 4 | 1724 | 75.51 | 1799.51 | 10.95 | 9.70 | 211.03 | 18.99 | 18.0 |
| 5 | 1727 | 72.70 | 1799.70 | 11.03 | 9.70 | 228.11 | 20.22 | 17.7 |
| 6 | 1727 | 72.70 | 1799.70 | 10.43 | 9.20 | 208.22 | 18.79 | 18.1 |
| 7 | 1734 | 65.44 | 1799.44 | 10.39 | 9.00 | 234.84 | 20.69 | 17.6 |
| 8 | 1734 | 65.44 | 1799.44 | 10.89 | 9.50 | 234.84 | 20.69 | 17.6 |
| 9 | 1756 | 43.99 | 1799.99 | 10.46 | 9.20 | 213.39 | 19.17 | 18.0 |
| 10 | 1735 | 64.90 | 1800.00 | 10.38 | 9.20 | 200.42 | 18.21 | 18.2 |
| 12 | 1756 | 43.99 | 1799.99 | 10.26 | 8.80 | 247.27 | 21.55 | 17.4 |
| 13 | 1735 | 64.90 | 1799.90 | 10.28 | 8.30 | 335.93 | 27.18 | 16.2 |
| 14 | 1715 | 85.03 | 1800.03 | 10.50 | 9.20 | 220.54 | 19.68 | 17.9 |
| 15 | 1719 | 80.78 | 1799.78 | 10.48 | 9.00 | 250.18 | 21.75 | 17.4 |
| 16 | 1729 | 71.13 | 1800.13 | 10.42 | 9.20 | 206.64 | 18.67 | 18.1 |
| 17 | 1729 | 71.13 | 1800.13 | 10.42 | 8.50 | 325.22 | 26.54 | 16.3 |
| 18 | 1730 | 70.08 | 1800.08 | 10.91 | 9.90 | 171.71 | 17.16 | 19.9 |

For experiments 20-31, the cement samples were collected at the end of the experiments for total solids, water content and solution viscosity measurements.

In all cases, the rubber crumb was completed dissolved in solution. The results are summarized in Table 8.

TABLE 8

Measured physical properties of rubber cement after dissolving/separation experiments

| # | solvent | rubber slurry starting temp. (° C.) | total rubber solids (wt %) | water (wt %) | Solution viscosity @15° C. 2 rpm (cps) | Solution viscosity @25° C. 2 rpm (cps) |
|---|---|---|---|---|---|---|
| 20 | Hexanes | 62.5 | 19.5 | 19.0 | 21498 | 18311 |
| 21 | Hexanes | 61 | 18.0 | 25.8 | 19826 | 16609 |
| 22 | Isohexane | 60 | 20.3 | 17.8 | 22285 | 19204 |
| 23 | Isopentane | 21 | 19.6 | 19.3 | 14592 | |
| 24 | Isopentane | 21.4 | 19.6 | 16.5 | 9673 | |
| 25 | Hexanes | 64.9 | 18.3 | 19.1 | 7558 | 6577 |
| 26 | Isopentane | 20.6 | 20.3 | 22.3 | 10341 | |
| 27 | Isopentane | 21.7 | 21.1 | 20.1 | | |
| 29 | n-pentane | 21 | 21.7 | 14.6 | 5787 | |
| 30 | Hexanes | 64.9 | 17.7 | 29.9 | 10744 | 8773 |
| 31 | Isopentane | 21.1 | 22.2 | 13.7 | 9050 | |

The effects of (1) initial agitation time on cement/water phase separation; (2) slurry temperature on settling rate; (3) rubber crumb size on settling rate; (4) calcium stearate level on settling rate and (5) type on settling profile are illustrated in FIGS. 1 to 5 respectively.

Based on the lab batch experiments, it is concluded that:
(1) rubber cement and water phase separation was observed in all hydrocarbon solvents tested (hexane, methylpentane, n-pentane and isopentane);
(2) at 60-65° C. starting slurry temperature, phase separation appears to reach equilibrium in 15 minutes;
(3) the initial rate of phase separation is dependent on the slurry temperature (faster initial phase separation rate for higher temperature);
(4) the phase separation rate is dependent on mixing time;
(5) phase separation does not appear to be effected by crumb size distribution (6.3-19.9 mm vs. 0.5-3.5 mm crumb size);
(6) calcium stearate level in the rubber crumb may influence the initial phase separation rate; and,
(7) experiments involving tower boiling point solvents such as isopentane and n-pentane conducted at room temperature showed clear phase separation in 20-30 minutes and at lower separation rate than other experiments done at higher temperatures.

Example 2

Batch Trials

General Description of Procedure

A 50-L vessel equipped with 4 flat baffles and a 3-stage Viscoprop agitator was used in LANXESS Rubber plant to carry out the batch trials in order to determine the detail design dimensions of the production scale vessel.

Crumbs were collected from the rubber plant and separated from the bulk water. The amount of crumbs for one trial was weighed in the laboratory. Water, which was also taken directly from the rubber slurry from the plant, was metered into the mixing vessel manually, and then the pre-weighed amount of rubber crumbs was inserted into the mixing vessel. The agitator was started and the vessel closed. The mixing vessel was brought to the desired temperature by means of a heating jacket. After the polymerization reaction was quenched, the solvent was metered into the closed vessel in the desired amount. Through a sight glass at the side of the vessel, the flow and settling behaviour were observed. Samples were taken from the organic and water phase from the closed vessel. The sampling rod for the organic phase was equipped with a screen, thus no undissolved rubber particles infiltrated the sample.

Trial 1

The purpose of trial 1 was to study the dissolving behaviour of the rubber in hexane with the bulk water present. The filling volume was 45 l. The rubber concentration in the slurry was 8 wt %. The dry rubber concentration was max. 19.4 wt % with respect to organic phase (if fully dissolved). The specific power input of the agitator was 1.2 W/l. The temperature was 50° C. A picture of the crumbs was taken before insertion into the vessel. After 3, 7, 14, 30, 60 and 120 minutes mixing time the agitator was switched off and samples of the organic phase were taken. Then the mixer was started again and the organic phase was mixed with the aqueous phase. After 3 and 7 minutes mixing time, the separation and appearance of a sharp interface takes longer than 1 minute. After 14 minutes mixing time, the phase separation takes about 40 seconds.

Trial 2

The purpose of trial 2 was to study the dissolving behaviour of the rubber in isopentane with the bulk water present. The filling volume was 45 l. The rubber concentration in the slurry was 8%. The dry rubber concentration was max. 19.4% with respect to organic phase (if fully dissolved). The specific power input of the agitator was 1.2 W/l. The temperature was 50° C. A picture of the crumbs was taken. After 3, 7, 14, 30, 60 and 120 minutes mixing time the agitator was switched off and samples of the organic phase were taken. Afterwards the organic phase was mixed in the aqueous phase again. After 3 and 7 minutes mixing time, the separation and appearance of a sharp interface took longer than 1 minute. After 14 minutes mixing time, the phase separation took about 40 seconds.

Figure 9:
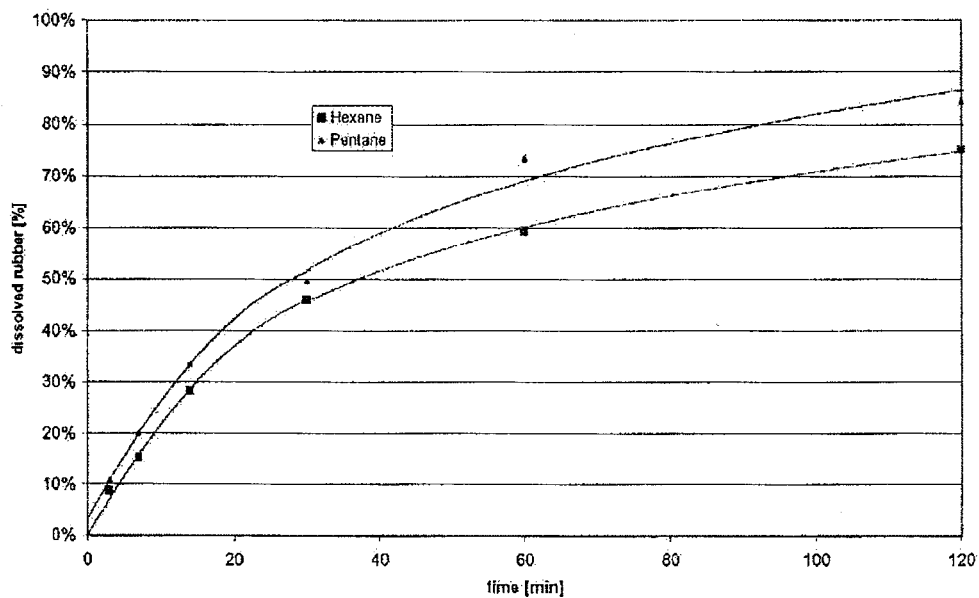
FIG. 9 is a dissolving curve for butyl rubber in both hexane and isopentane.

The dissolving curve is illustrated in FIG. 9. 23 minutes was chosen as the standard mixing time for trial 3, 4 and 5, which resulted in approximately 41% of the rubber dissolved after that time. This solution mixture allows for good phase separation for settling.

Trial 3

The purpose of trial 3 was to study the settling behaviour of the rubber in hexane/water and the dissolving behaviour of the rubber in hexane after removal of bulk water. The filling volume was 45 l. The rubber concentration in the slurry was 8%. The dry rubber concentration was max. 19.4% with respect to organic phase (if fully dissolved). The specific power input of the agitator was 1.2 W/l. The temperature was 50° C.

After 23 minutes mixing time, the agitator was switched off and samples were taken of the organic and water phase directly after settling and 30 minutes later without stirring (only organic phase). The dissolved rubber concentration in the cement was about 6.3% (after 23 minutes agitation) and 6.4% (30 minutes after mixer stopped, settling time without stirring). This corresponds to a portion of 33% of the rubber being dissolved. The settling time was about 45 seconds. 2 minutes after the mixer stopped, no further change of interface was observed.

After 30 minutes of settling, the water phase was drained and the organic phase was agitated for 120 minutes again.

Figure 10:
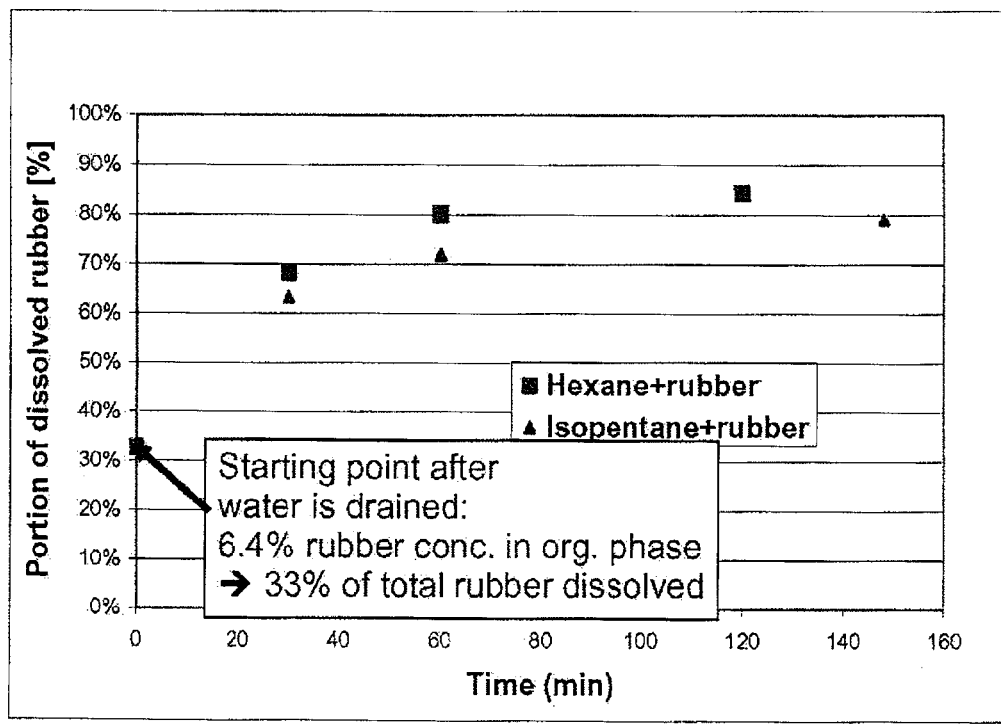
FIG. 10 is a dissolving curve for butyl rubber in both hexane and isopentane.

The agitation conditions were insufficient, because the agitator system was optimized for CMU, or high liquid levels in the mixer respectively. After 30, 60 and 120 minutes mixing time samples of the organic phase were taken. The dissolving curve is illustrated in FIG. 10.

Trial 4

The purpose of trial 4 was to study the settling behaviour of the rubber in isopentane/water and dissolving behaviour of the rubber in isopentane after removal of bulk water. The filling volume was 45 l. The rubber concentration in the slurry was 8%. The dry rubber concentration was max. 19.4% with respect to organic phase (if fully dissolved). The specific power input of the agitator was 1.2 W/l. The temperature was 50° C.

After 23 minutes mixing time the agitator was switched off and samples were taken of the organic and water phase directly after settling and 30 minutes later without stirring (only organic phase). The dissolved rubber concentration in the cement was about 6.4% (after 23 minutes agitation) and 6.4% (30 minutes after mixer stopped, settling time without stirring). This corresponds to a portion of 33% of the rubber being dissolved. The conclusion is that in the settler (without agitation) the rubber dissolves very slowly.

The settling time was about 30 seconds. Two minutes after the mixer stopped, no further change of interface was observed. Afterwards the water phase was drained and the organic phase was agitated for 120 minutes again. The agitation conditions were insufficient, because the agitator system was optimized for CMU. After 30, 60 and 120 minutes mixing time samples were taken of the organic phase. The dissolving curve is pictured in FIG. 10.

Trial 5

The purpose of trial 5 was to study the settling behaviour of the rubber in isopentane/water with a higher solid concentration. The filling volume was 45 l. The rubber concentration in the slurry was 8%. The dry rubber concentration was max. 21.7% with respect to organic phase (if fully dissolved). The specific power input of the agitator was 1.2 W/l. The temperature was 50° C.

After 23 minutes mixing time, the agitator was switched off and samples were taken of the organic and water phase. The dissolved rubber concentration in the cement was about 7.5%. This corresponds to a portion of 34.6% of the rubber being dissolved. The settling time was about 30 seconds. Two minutes after the mixer stopped, no further change of interface were observed.

Trial 6

The purpose of trial 6 was to study the matting behaviour of the rubber at the interface between phases in isopentane/water and the power requirement for breaking the mat. The filling volume was 30 l. The rubber concentration in the slurry was 8%. The dry rubber concentration was max. 19.4% with respect to organic phase (if fully dissolved). The specific power input of the agitator was 1.2 W/l. The temperature was 50° C.

Water, crumbs and solvent were put into the mixing vessel without stirring. 30 minutes later the agitator was switched on and the rotational speed was increased until the mat broke. Afterwards the mixture was stirred for another 7, 14 and 30 minutes (stop of mixer after these mixing times) to observe the organic phase at the lower filling level (30 l instead of 45 l) visually.

The mat was destroyed at low power input (54 rpm, 0.02 W/l). After 7 minutes initial mixing time, a clear isopentane phase is visible (after settling). After 14 minutes initial mixing time, no clear organic phase/solvent phase was visible and the stratification of the organic phase was acceptable.

Trial 7

The purpose of trial 7 was to study the emulsion formation of the rubber in isopentane/water. The filling volume was 30 l (lower level for observation in sight glass). The rubber concentration in the slurry was 8%. The dry rubber concentration was max. 19.4% with respect to organic phase (if fully dissolved). The specific power input of the agitator was 1.2 W/l. The temperature was 50° C.

After initial mixing for 23 minutes the agitator was switched off. The separation was completed in 1 minute. Afterwards the mixture was mixed again for 1 minute and then the rotational speed was slowed down to simulate the flow in a pipe. Then the rotational speed was increased again for 5-7 seconds to simulate a pump. Afterwards the agitator was switched off. The interface was 20 mm lower, thus emulsion formation had happened. This corresponds to additional 1.9 l water in the organic phase compared to the initial state after first separation. The mixer was then switched on again. After initial mixing for 1 minute the interface level did not change. After further mixing for 11 minutes the interface level recovered back to the original height. Thus, this kind of emulsion can be broken after a long agitation time.

Results

In Trial 1 and 2 the dissolving curves of hexane and isopentane were determined (see FIG. 9). In the system rubber/solvent/water isopentane dissolves more rubber in the same time period than hexane. The deviation might be within the accuracy of the analytics.

From chemical engineering principle, two mixing vessel in series results in more homogenous mixing when compared with one mixing vessel with the same mixing time. The dissolving curve of hexane and the residence time distribution of two ideal CSTR's were used to calculate the amount of undissolved rubber after the mixing stage for several different diameters of the mixing chambers (see Table 9).

TABLE 9

Determination of the representative batch mixing time

| Volume of each mixing vessel (m³) | Number of Mixing Chambers | Total mixing volume (m³) | Ratio of Undissolved Rubber (%) | Representative Batch Mixing Time (min) |
|---|---|---|---|---|
| 175 | 1 | 175 | 59.0 | 22.7 |
| 21.3 | 2 | 42.6 | 81.6 | 8.2 |
| 50.4 | 2 | 100.8 | 66.1 | 17.2 |
| 72.0 | 2 | 144 | 59.0 | 22.7 |
| 98.0 | 2 | 196 | 52.8 | 32.5 |

Based on the results from trial 3, 4 and 5, the characteristic settling time of the batch trials was chosen to be 40 seconds. The characteristic settling time is not the residence time in the designed continuously operated settler. It can be defined as a kind of property data of the system rubber/water/solvent.

In the system rubber/solvent, after removal of bulk water, isopentane dissolves slightly less rubber in the same time compared to hexane (see FIG. 10). However, because of the insufficient agitation conditions, the results are not representative. Within accuracy, the dissolving behaviour of hexane and isopentane appears to be similar.

Trial 6 shows that of the rubber mat observed in the experiments is destroyable at low power input (0.02 W/l).

Trial 7 shows that it is possible to create a stable emulsion and that this kind of emulsion can be broken after long agitation time. However, in order to ensure the settling efficiency, the conditions that may result in the stable emulsion should be avoided. Therefore, an "all-in-one" mixer/settler is recommended to minimize transfer piping in between so as to avoid stable emulsion formation.

Example 3

Continuous Pilot Scale Tests

A pilot mixer/settler scaled down from the full scale design was constructed to verify the mixing and settling efficiency under continuous flow conditions. The pilot mixer/settler is composed of two mixing chamber (each has a diameter of 1200 mm) and a settling chamber with a diameter of 508 mm. The total volume of the mixing and settling section is 2920 L. The mixing chambers are equipped with agitators. A small agitator is installed at the end of the settling chamber to break any rubber mat build up. The rubber slurry and plant hexane were pumped from the main production facility to the pilot unit. The cement and water separated out of the mixer settler were pumped back to the production unit. The tests were conducted under the following conditions, Product Grade=BB2030 base polymer
Slurry concentration to pilot=6 wt %
Cement concentration target=20 wt %
Mixing agitator speeds (A8701 and A8702) were set at 83%, i.e. 141 rpm
Hexane flow was continuous and the slurry flow was dosed intermittently
Settler interface was under manual control relying on frequent visual field check
Mixture temperature in the mixer and settler indicated by the outlet water temperature was 57 to 59° C.
The mean mixing time tested was from 36 to 112 min.

Figure 11:
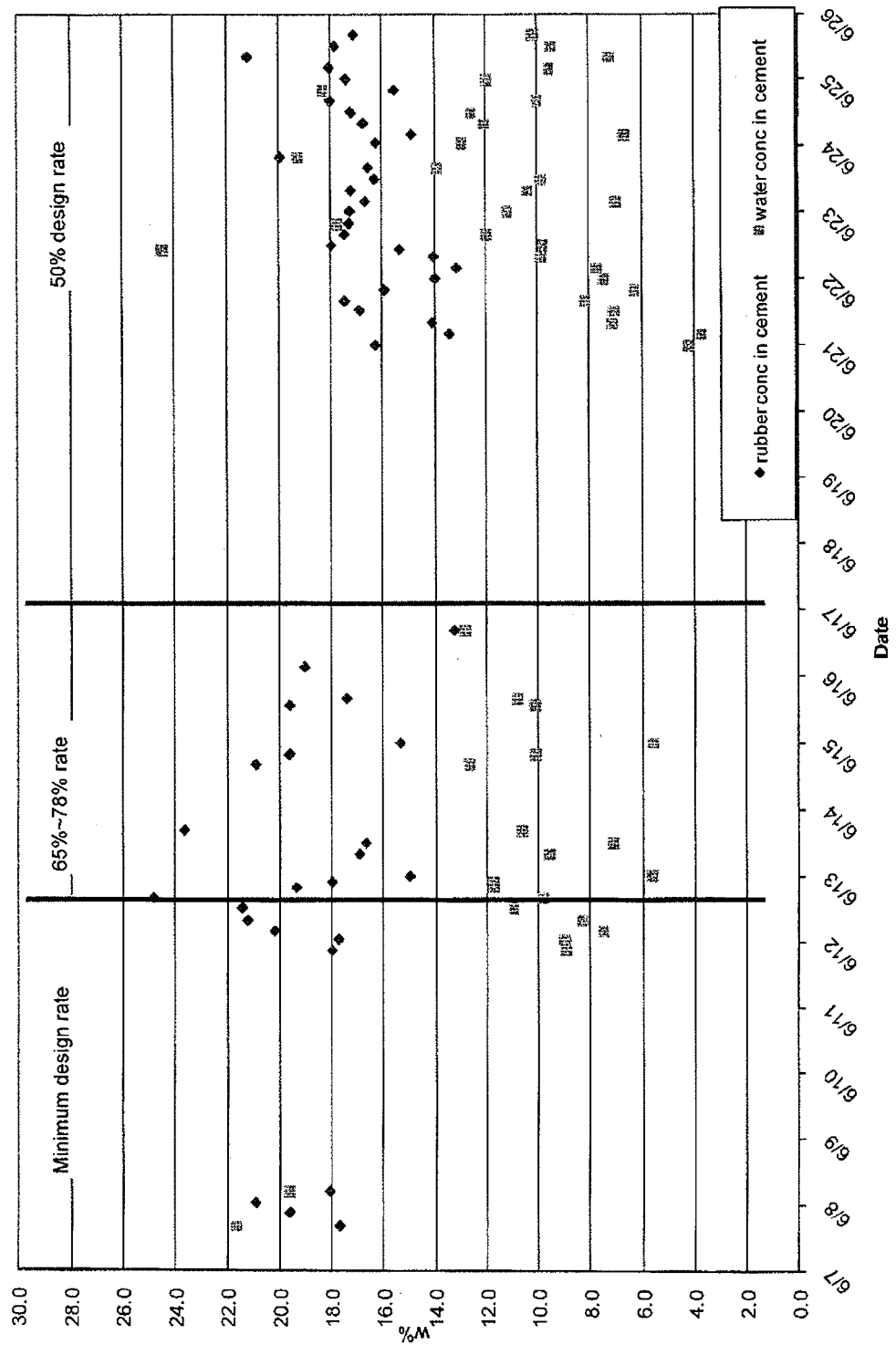
FIG. 11 illustrates the rubber and water content in the rubber cement samples collected during a pilot scale continuous production test; and, FIG. 12 illustrates the hexane content in the water samples collected during the pilot scale test.
Figure 12:
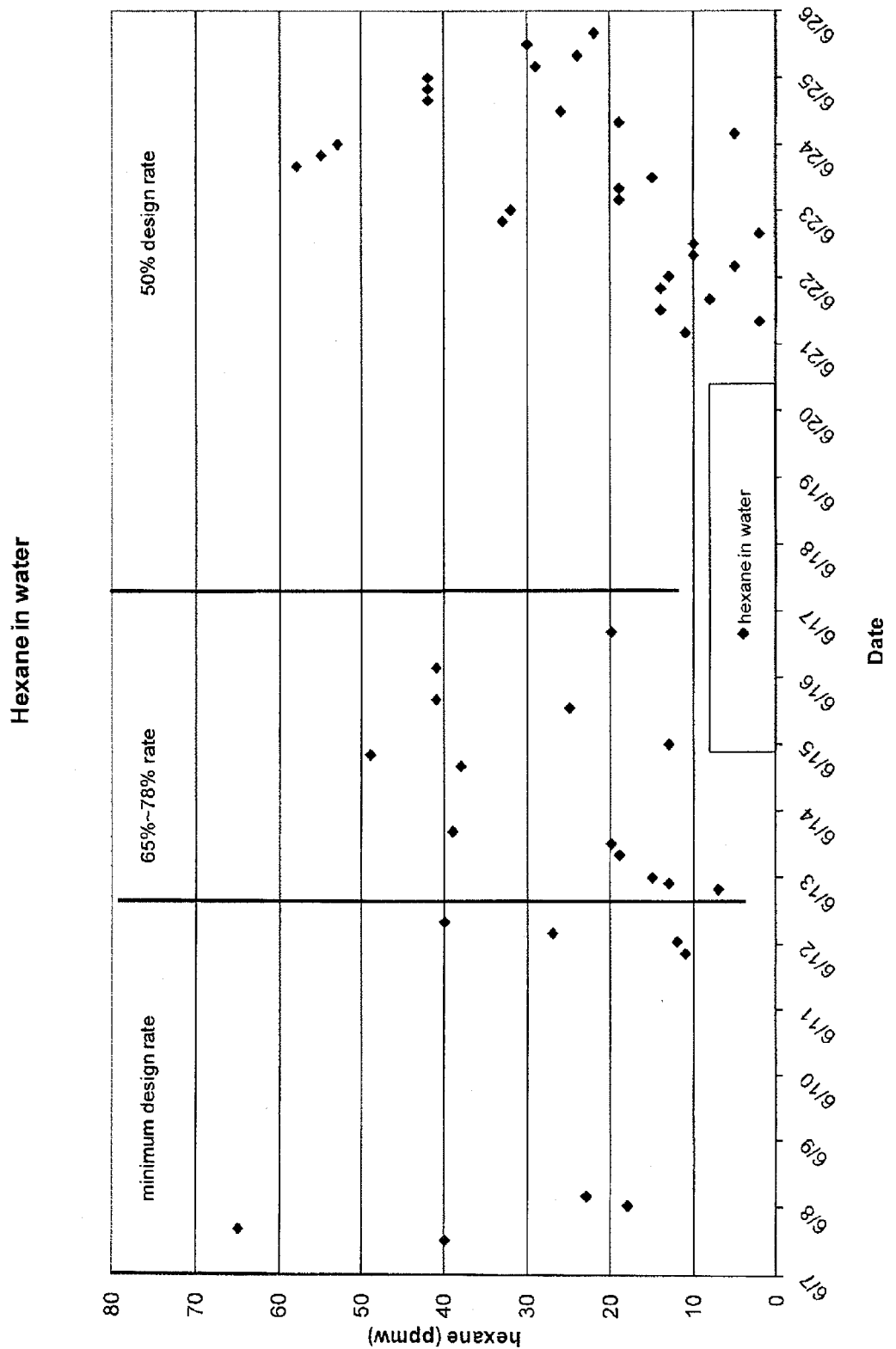

Rubber cement samples were taken from the cement outlet of the settler section to measure the rubber content in cement. Water samples were taken from the water outlet of the settler section and GC analysis was conducted to measure the residual hexane level in the water phase. The results can be found in FIG. 11 and FIG. 12.

The conclusions from the pilot scale tests are:
the mixing in the first two mixing chambers and the water/solvent exchange worked well.
the phase separation worked as designed.
rubber is partially dissolved as designed and the amount of dissolved rubber is dependent on the residence time and the temperature. The portion of dissolved rubber is higher in the continuous experiments than expected from batch experiments.
the phase separation behavior is not expected to be different if isopentane or isohexane is used as solvent, based on previous batch tests and lab tests.

What is claimed is:

1. An apparatus for the continuous production of a butyl rubber cement from butyl rubber, the apparatus comprising: a flow-through vessel comprising:
   a) a first vessel portion comprising an enclosed dissolving zone configured for receiving both of a butyl and water rubber slurry and a non-halogenated organic solvent, the dissolving zone comprising a mixer for agitating the slurry and the solvent to dissolve the butyl rubber in the solvent to form butyl rubber cement in water; and
   b) a second vessel portion comprising an enclosed separator zone in fluid communication with the dissolving zone, the separator zone being configured for phase separation of the butyl rubber cement from the water with formation of a water layer and a cement layer separated by an interface layer, and the separator zone comprising a first outlet configured for output of the water layer from the separator zone, and a second outlet configured for output of the cement layer from the separator zone,
wherein the dissolve zone is disposed horizontally adjacent the separating zone, and the flow-through vessel is configured for lateral flow through the vessel from the dissolving zone through the separator zone.

2. The apparatus according to claim 1, wherein the separator zone further comprises a mixer to agitate and disrupt the interface layer.

3. The apparatus according to claim 1, wherein the separator zone further comprises a fluid conduit for introducing rubber cement into the interface layer to agitate and disrupt the interface layer.

4. The apparatus according to claim 1, wherein, in the separator zone, the rubber cement layer forms vertically above the water layer with the interface layer therebetween, and the second outlet is positioned in the separator zone above the first outlet, with the second outlet at a location positioned for flow of rubber cement out of the separator zone through the second outlet, and the first outlet positioned for flow of water out of the separator zone through the first outlet.

5. The apparatus according to claim 4, wherein the separator zone further comprises a fluid conduit for introducing rubber cement removed from the separator zone back into the separator zone and into the interface layer to agitate and disrupt the interface layer.

6. The apparatus according to claim 5, wherein:
the apparatus comprises a first pre-mixing junction for pre-mixing of the butyl rubber and water slurry with the non-halogenated organic solvent prior to introduction into the dissolving zone;
the dissolving zone comprises at least two laterally adjacent mixing chambers, wherein:
   a first of the mixing chambers comprises an inlet for receiving the premixed slurry and solvent, and an outlet in fluid communication with a subsequent one of the mixing chambers, and
   a subsequent one of the mixing chambers comprises an outlet in fluid communication with the separator zone; and
each of the at least two mixing chambers comprises a mixer for agitating the slurry and solvent.

* * * * *